US 10,082,769 B2

(12) United States Patent
Adkins et al.

(10) Patent No.: US 10,082,769 B2
(45) Date of Patent: Sep. 25, 2018

(54) PRODUCING IMAGES OF SECURITY FEATURES

(71) Applicant: ENTRUST DATACARD CORPORATION, Shakopee, MN (US)

(72) Inventors: David A. Adkins, Eden Prairie, MN (US); Timothy J. Flitsch, Lakeville, MN (US); Richard C. Nubson, Eden Prairie, MN (US)

(73) Assignee: ENTRUST DATACARD CORPORATION, Shakopee, MN (US)

(*) Notice: Subject to any disclaimer, the term of this patent is extended or adjusted under 35 U.S.C. 154(b) by 167 days.

(21) Appl. No.: 14/438,406

(22) PCT Filed: Oct. 25, 2012

(86) PCT No.: PCT/US2012/061843
§ 371 (c)(1),
(2) Date: Apr. 24, 2015

(87) PCT Pub. No.: WO2014/065799
PCT Pub. Date: May 1, 2014

(65) Prior Publication Data
US 2015/0293495 A1 Oct. 15, 2015

(51) Int. Cl.
G03H 1/10 (2006.01)
G03H 1/00 (2006.01)
(Continued)

(52) U.S. Cl.
CPC .......... G03H 1/0011 (2013.01); B42D 25/29 (2014.10); B42D 25/328 (2014.10); G03H 1/202 (2013.01);
(Continued)

(58) Field of Classification Search
CPC ........ G03H 1/0011; G03H 1/30; G03H 1/202; G03H 2227/04; G03H 2001/0415;
(Continued)

(56) References Cited

U.S. PATENT DOCUMENTS 6,262,819 B1* 7/2001 Shirakura .............. G03H 1/268
359/1
2003/0030858 A1 2/2003 Kodama
(Continued)

FOREIGN PATENT DOCUMENTS

CN 101416124 4/2009
DE 19809502 2/1999
(Continued)

OTHER PUBLICATIONS

International Search Report and Written Opinion for International Application No. PCT/US2012/061843, dated Jul. 15, 2013, 10 pgs.
(Continued)

Primary Examiner — Mustak Choudhury
(74) Attorney, Agent, or Firm — Hamre, Schumann, Mueller & Larson, P.C.

(57) ABSTRACT

Processes and systems are described that can produce images including both three dimensional holographic images and two dimensional variable data, which can provide personalized security features in a document. A photosensitive film can be pressed against a first reflective optical device. A laser beam can be directed through a selected first area of the photosensitive film onto the first reflective optical device to produce a three dimensional holographic image in the photosensitive film. A previously masked second area of the photosensitive film can be pressed against a second reflective optical device. The laser beam can project an image constructed by a spatial light modulator and can be directed through the second area of the
(Continued)

photosensitive film onto the second reflective optical device to produce a two dimensional image in the second area. During the process, the web tension of the photosensitive film is controlled.

13 Claims, 10 Drawing Sheets

(51) Int. Cl.
| | |
|---|---|
| G03H 1/20 | (2006.01) |
| G03H 1/30 | (2006.01) |
| B42D 25/29 | (2014.01) |
| B42D 25/328 | (2014.01) |
| G03H 1/04 | (2006.01) |
| G03H 1/22 | (2006.01) |
| G03H 1/28 | (2006.01) |
| G03H 1/02 | (2006.01) |

(52) U.S. Cl.
CPC ............... *G03H 1/30* (2013.01); *G03H 1/28* (2013.01); *G03H 2001/0232* (2013.01); *G03H 2001/0415* (2013.01); *G03H 2001/205* (2013.01); *G03H 2001/2223* (2013.01); *G03H 2210/22* (2013.01); *G03H 2210/32* (2013.01); *G03H 2210/54* (2013.01); *G03H 2210/562* (2013.01); *G03H 2222/13* (2013.01); *G03H 2222/36* (2013.01); *G03H 2227/04* (2013.01); *G03H 2270/23* (2013.01)

(58) Field of Classification Search
CPC ....... G03H 2001/2223; G03H 2210/22; G03H 2210/32; G03H 2210/54; G03H 2222/13; G03H 2270/23; G03H 1/28; G03H 1/2645; G03H 1/265; G03H 2001/2655; G03H 2001/266; G03H 2001/2665; G03H 2001/267; G03H 2001/2675; G03H 1/08; G03H 1/0808; G03H 1/0841; G03H 2001/0816; G03H 2001/0825; G03H 1/0005; G03H 1/02; G03H 1/04; G03H 1/10–1/14; G03H 1/268; G03H 2001/0033; G03H 2001/0421; G03H 2001/0423; G03H 2001/0833; G03H 2001/085; G03H 2001/0858; G03H 2001/0027; G03H 2210/40; G03H 2210/44; G03H 2210/441; G03H 2210/45; G03H 2210/562; B42D 25/29; B42D 25/328; G11B 7/1275; G11B 7/1353; G11B 7/1362; G11B 7/1365; G11B 7/1369; G11B 7/1372; G11B 7/1381; G11B 7/123; G11B 7/131; G11B 7/13925
USPC ......... 359/1, 2, 9–12, 15, 18, 20–25, 27, 28, 359/30–35, 572, 576; 428/29, 220, 354, 428/915, 916; 340/505, 572.1, 572.7; 156/230, 243, 325; 283/86, 901; 430/1, 430/2
See application file for complete search history.

(56) References Cited

U.S. PATENT DOCUMENTS

| | | | |
|---|---|---|---|
| 2003/0058326 A1* | 3/2003 | Araki | .................... B41F 19/062 347/217 |
| 2005/0068596 A1* | 3/2005 | Claudelli | ............. G03H 1/0486 359/25 |
| 2007/0024939 A1* | 2/2007 | Harris | .................. G03H 1/0248 359/28 |
| 2009/0080298 A1* | 3/2009 | Yamasaki | ............ G11B 7/0956 369/44.23 |
| 2009/0162756 A1 | 6/2009 | Staub et al. | |
| 2011/0134496 A1 | 6/2011 | Tompkin et al. | |

FOREIGN PATENT DOCUMENTS

| | | |
|---|---|---|
| EP | 2290475 | 3/2011 |
| TW | 577814 | 3/2004 |
| WO | 2008145077 | 12/2008 |

OTHER PUBLICATIONS

Third Party Observations filed in corresponding European Application No. 12887259.5, dated Oct. 8, 2015, 8 pgs. (English translation included).
The extended European Search Report of European Application No. 12887259.5, dated Mar. 24, 2016, total 11 pages.
Office Action of Chinese patent application No. 201280077627.6, dated May 4, 2017, with English translation, 8 pages provided.

* cited by examiner

PRODUCING IMAGES OF SECURITY FEATURES

FIELD

This disclosure relates to producing images of security features for a document.

BACKGROUND

Holography is a technique that allows the light scattered from an object to be recorded and later reconstructed so that when an imaging system (a camera or an eye) is placed in the reconstructed beam, an image of the object can be seen even when the object is no longer present. The recorded holographic images (or holograms) can change as the position and orientation of the viewing system changes in a similar way as if the object were still present, which can make the image appear three-dimensional. Holograms can include a generally random structure of varying intensity, density or profile. Holograms can be attached to a security document such as driver's licenses, credit cards, bank cards, ID cards, books, DVDs, sports equipment, passports, etc., to authenticate the genuineness of the document. For example, embossed holography has been used in passport documents in many countries.

SUMMARY

Methods and systems are described that can produce variable images, including three dimensional holographic images and/or two dimensional variable data, on a photosensitive film. The methods and systems described herein can produce images which represent security features for a secure document. The security features can be personalized to provide a higher value to the customer since the security features can be verified by document control personnel. The security features can include, for example, document numbers, image of bearer, and other variable data. Variable images corresponding to the security features can be produced at a normal personalization speed compatible with a process to produce the document.

In one embodiment, a process for handling a photosensitive film to produce a holographic image therein, is provided. The photosensitive film can be rolled at a downstream position. A web tension of the photosensitive film can be controlled at an upstream position. A portion of the photosensitive film between the downstream position and the upstream position is pressed against a surface of a reflective optical device. A laser beam is directed through the photosensitive film onto the reflective optical device where the laser beam interferes with a second laser beam reflected from or transmitted through the reflective optical device to generate the holographic image in the photosensitive film.

In another embodiment, a system for handling a photosensitive film to produce holographic images by copying a reflective optical device, is provided. The system includes a supply mechanism to supply the photosensitive film to the reflective optical device, a tension-control mechanism to control a web tension of the photosensitive film, a mounting mechanism to press a portion of the photosensitive film against a surface of the reflective optical device, an optical assembly adjacent the reflective optical device, and a collection mechanism downstream the supply mechanism to collect the photosensitive film. The optical assembly emits an incident laser beam through the photosensitive film to interfere with a second laser beam reflected from or transmitted through the reflective optical device to generate the holographic images in the photosensitive film.

DRAWINGS

FIG. 2b illustrates the master hologram in FIG. 2a.

DETAILED DESCRIPTION

Figure 1A:
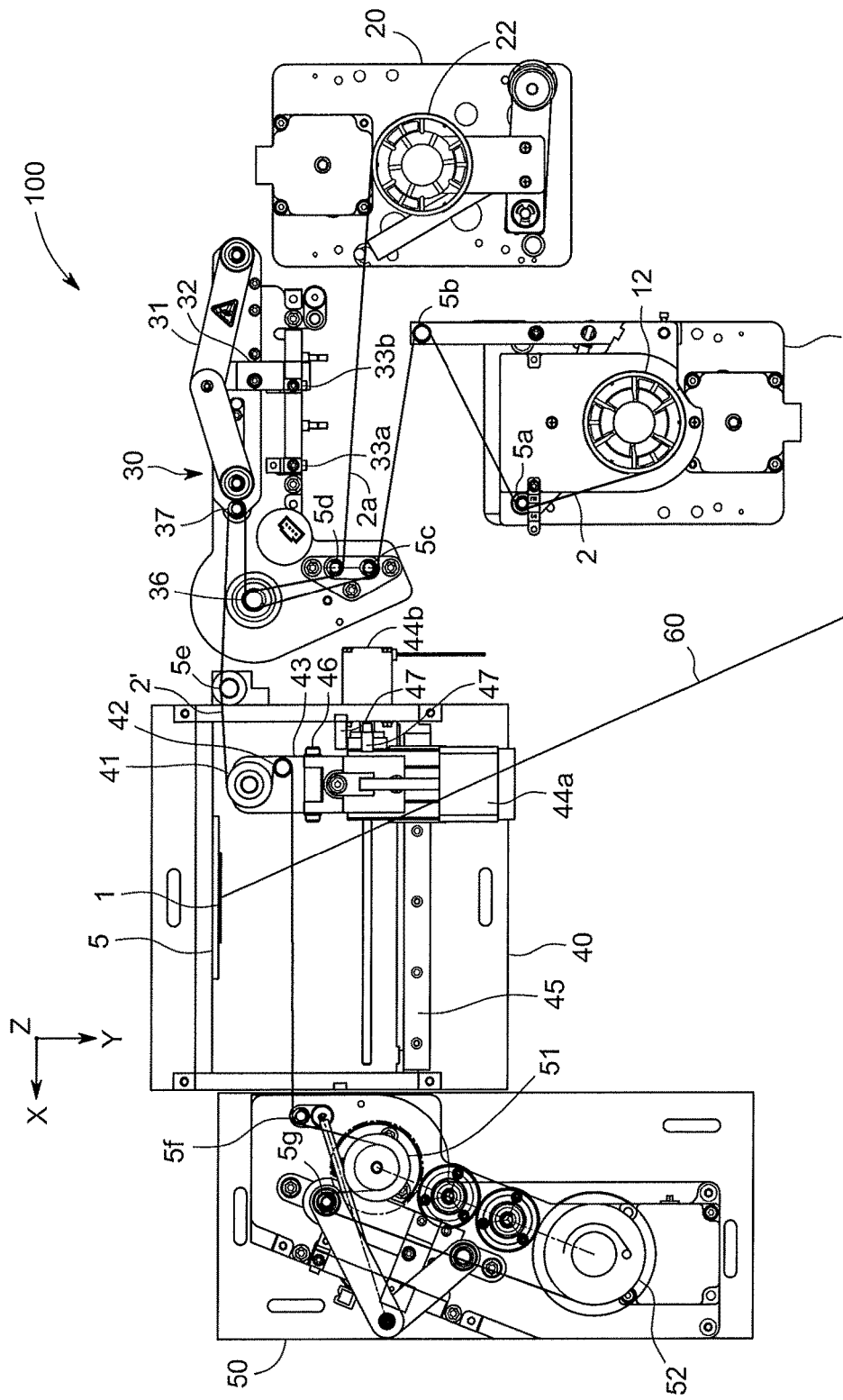
FIG. 1a illustrates a system for producing variable images on a photosensitive film, where the photosensitive film is mounted on a mounting mechanism, ready to apply to a reflective optical device, according to one embodiment.

Embodiments described herein are for producing images in a photosensitive film. The images can include three dimensional holographic images that can be created or copied from a master hologram, and/or two dimensional variable data constructed by a spatial light modulator. The images can be used as personalized security features on a document. The document can be, for example, plastic cards and passports.

Security features for a secure document can be personalized to provide a higher value to the customer since the security features (i.e., document numbers, image of bearer, and other variable data) can be verified by document control personnel. The security features can be recorded as images that include, for example, three dimensional holographic images and/or two dimensional patterns such as alphanumeric and photo identification images. The images can be produced at a normal personalization speed compatible with a process to produce the document.

Recording of images can be accomplished in a number of different mediums. In one embodiment, photopolymer is used as the recording medium. The following table lists typical properties of an exemplary photopolymer. Photopolymers can be post-developed with full spectrum non-coherent light (or white light) after the 3D or 2D images are produced. Photopolymers also have good durability and are generally insensitive to water. Photopolymers do not shrink or swell significantly during processing and can be readily adaptable to integration into a system for producing variable images and be affixed to a document. The photopolymer can be non-liquid. It will be appreciated that photosensitive materials having appropriate properties other than the photopolymer of Table 1 can also be used as the recording medium.

TABLE 1

Properties of a photopolymer

| Material | Processing | Type of hologram | Exposure (mJ/cm²) | Spectral Sensitivity (nm) | Resolution limit (nm) | Max diffraction efficiency |
|---|---|---|---|---|---|---|
| Photopolymer | Post exposure with white light | Phase or color | about 18 to 36 dependent on color | 400-700 | about 2 | about 1.0 |

In one embodiment, a photosensitive film is used for producing images. The photosensitive film has a photosensitive layer, a carrier, and a cover sheet. The photosensitive layer is sandwiched by the carrier and the cover sheet. The photosensitive layer can be a photopolymer material described above. The carrier can be a PET carrier. The cover sheet can be made of polyethylene (PE). It will be appreciated that the photosensitive layer, the carrier and the cover sheet can be made of other appropriate materials. The photosensitive layer can be coated on the carrier to physically contain the dimensional stability until a light curing process. The exposed surface of the photosensitive layer can be tacky and prone to the accumulation of dust. The cover sheet can protect the photosensitive layer from contamination. In one embodiment, the cover sheet can be generally uniform black to block light and protect the photosensitive layer from contamination and/or shield the photosensitive layer from light. One example of the photosensitive film is Bayfol HX101 supplied by Bayer. It will be appreciated that photosensitive films from other suppliers can also be used.

FIG. 1a illustrates an example of a system 100 for producing variable images on a photosensitive film 2. The system 100 is designed to apply the photosensitive film to a reflective optical device 1. The reflective optical device 1 is mounted on a station 5, having a surface facing the photosensitive film 2. In one embodiment, the reflective optical device 1 can be mounted on a surface of a turret to obtain a precise alignment with respect to the photosensitive film 2. The turret can move linearly in a direction vertical to the film and can rotate around a center thereof. A vacuum chuck can be mounted on the turret for pressing the photosensitive film 2 against the reflective optical device 1.

The photosensitive film 2 includes a carrier, a cover sheet, and a photosensitive layer sandwiched by the carrier and the cover sheet. The system 100 includes a supply mechanism 10 to provide a roll of the photosensitive film 2, a cover sheet take up 20 to remove the cover sheet from the photosensitive film 2, a tension control mechanism 30 to control the tension of a portion of the photosensitive film 2 to be applied to the reflective optical device 1, a mounting mechanism 40 to position the photosensitive film 2 and to press the photosensitive film 2 against the reflective optical device 1, and a roller take up 50 to collect the developed photosensitive film.

The photosensitive film can be transferred from a supply roll 12 to the tension control mechanism 30 by rolling. In one embodiment, the photosensitive film can be driven by a meter roller 51 of the roller take up 50 via one or more rollers, such as rollers 5a, 5b, 5c, 5d, 5e and 5f. The meter roller 51 can be controlled to transfer the photosensitive film with a predetermined unit length, for example, the length of the film 2 between the rollers 5e and 5f. In one embodiment, the predetermined unit length can be about 4 inches (about 10.2 cm) for a plastic card application. In another embodiment, the predetermined unit length can be about 5 inches (about 12.7 cm) for a passport application. It is to be understood that the unit length may depend on the dimensions of the reflective optical device 1 and/or the holographic image to be produced.

The cover sheet 2a of the photosensitive film 2 can be removed from the surface of the photosensitive layer, and stored by a rolled up cover sheet core 22 of the cover sheet take up 20. In one embodiment, the cover sheet 2a can be separated from the photosensitive film at a roller 36 where the cover sheet 2a and the remaining of the film are directed to different directions. The rolled up cover sheet core 22 can be driven by a motor to roll the photosensitive film 2 and collect the cover sheet 2a, and can be easily removed from the cover sheet take up 20 when it is full. The rollers 5a-d can be used to facilitate rolling the film.

The carrier plus the photosensitive layer 2' can be controlled by the tension control mechanism 30 to adjust the web tension of the photosensitive layer. The tension control mechanism 30 includes a roller 37 to roll the film 2'. The tension control mechanism 30 further includes a tension arm 31 and a position flag 32 connected to the tension arm 31 to control the movement of the roller 37. Sensors 33a and 33b are operatively connected to the position flag 32 to control the movement of the tension arm 31 so that a roller 37 can be moved toward or away from the mounting mechanism 40 in a direction generally parallel the surface of the optical reflective optical device 1. The sensors 33a and 33b can be aligned along a line generally parallel to the surface of the reflective optical device 1.

The roller take up 50 includes a motor which can continuously run the meter roller 51 to roll the film 2 so that the film 2 can be transferred from the supply mechanism 10 toward the mounting mechanism 40. The motor of the cover sheet take up 20 can run in a start/stop mode based on a state of the sensor 33b to control the transfer of the film 2. That is, when the roller 37 moves in a downstream direction (i.e., toward the mounting mechanism 40) to release the film 2' thereof and the sensor 33b senses the position of the tension arm 31 and changes its status, the motor of the cover sheet take up 20 runs to roll the film 2 via the roller 36. Then the tension arm 31 controls the roller 37 to move in an upstream direction (i.e., away from the mounting mechanism 40) to pull the film 2' thereof until the sensor 33b senses the position of the tension arm 31. Then, the motor of the cover sheet take up 20 stops and the tension arm 31 controls the roller 37 to move back in the downstream direction to release the film 2'. This process continues until the predetermined unit length of the film 2 is rolled by the meter roller 51. The sensor 33a acts as a failure limit sensor. When the sensor 33a changes its state upon sensing the position of the tension arm 31, a failure is detected. During the process of transferring the film 2, the tension of the film 2 can be controlled within a predetermined range. The tension control mechanism 30 also includes one or more rollers to roll the film.

In one embodiment, the web tension and the contact force on the rollers 41 of the mounting mechanism 40 are controlled to prevent the photosensitive film from wrinkling. One exemplary value of the web tension is about 3 to 4 ounces force and the contact force on the roller 41 is about 2 pounds. It will be appreciated that the web tension and the contact force on the roller 41 may be varied according to the nature of the photosensitive materials, and/or other settings, such as the power of a light source impinged on the photosensitive material.

The mounting mechanism 40 includes an apply roller 41 and a guide pin 42, which are installed on a mounting arm 43. The apply roller 41 can be, for example, an elastomeric roller. The guide pin 42 can be, for example, a stainless steel pin. The photosensitive film 2' transferred from the tension control mechanism 30 is wrapped around the apply roller 41 by the guide pin 42 and forms an "S" shape while going around the roller 41 and the guide pin 42. A first lead screw motor 44a is operatively connected to the mounting arm 43 to move the mounting arm 43 perpendicular to the surface of the reflective optical device 1, e.g., in a Y direction. A second lead screw motor 44b is operatively connected to the mounting arm 43 to move the mounting arm 43 parallel to the surface of the reflective optical device 1, e.g., in an X direction. A linear rail 45 is positioned parallel to the reflective optical device surface to provide repeatable linear motion of the mounting arm 43 along, for example, the X direction. During the movement of the mounting arm 43, the length of the film 2' between the rollers 5e and 5f can be kept as a constant.

An apply roller pivot 46 can rotate the roller 41 with respect to the surface of the reflective optical device 1, or the X-Z plane, so that the roller 41 can be aligned to the surface of the reflective optical device 1. The mounting mechanism 40 also includes one or more sensors 47 to monitor the position of the apply roller 41 and/or the photosensitive film with respect to the reflective optical device 1.

Figure 1B:
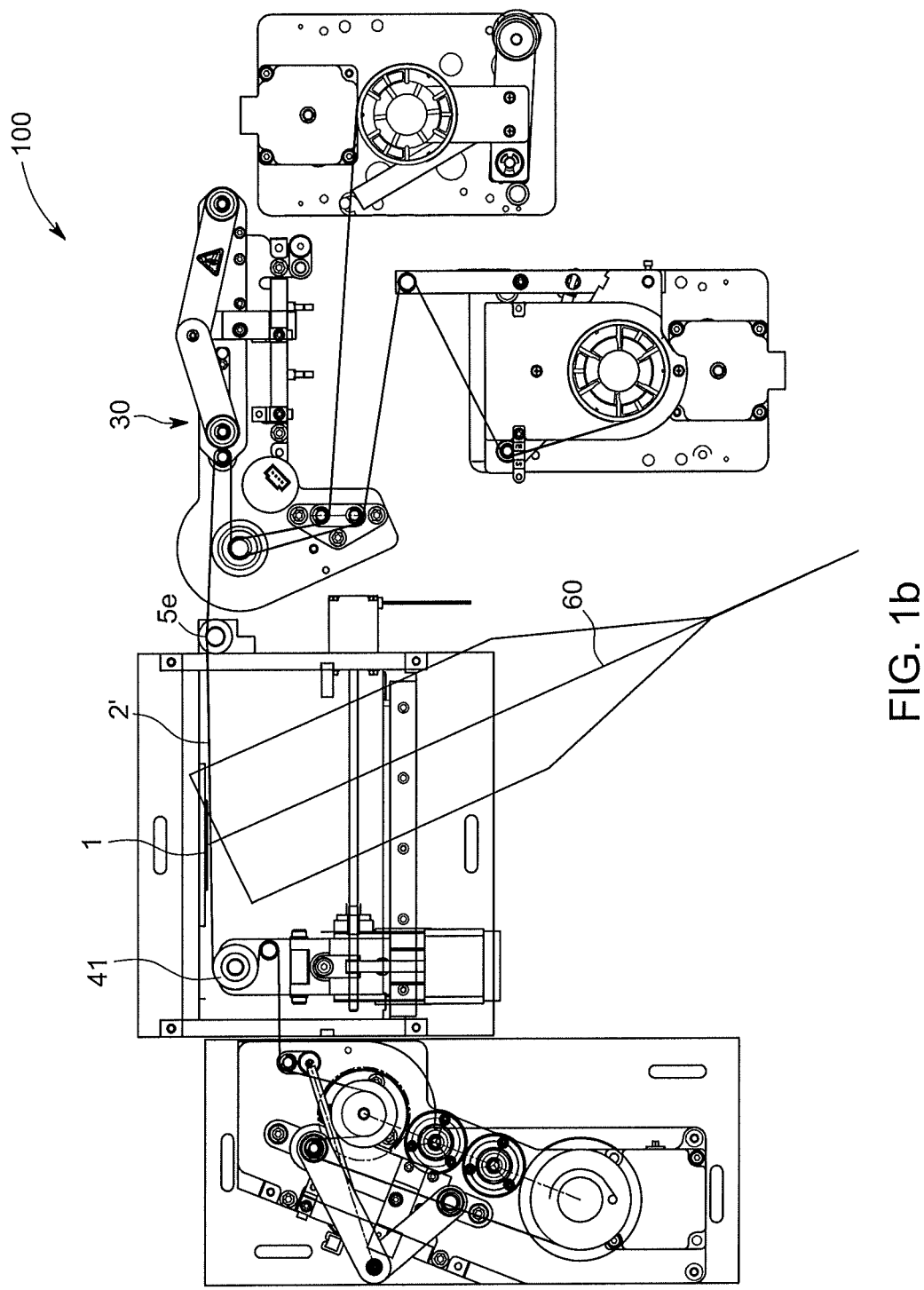
FIG. 1b is the system of FIG. 1a, where the photosensitive film is pressed against the surface of the reflective optical device.

The photosensitive film can be pressed against the surface of the reflective optical device 1. In one embodiment, the apply roller 41 at one end can cooperate with the roller 5e at the other end to press the film therebetween against the surface of the reflective optical device 1. FIG. 1b shows that the photosensitive film 2' is pressed against the surface of the reflective optical device 1. The photosensitive layer is in firm physical contact with the surface of the reflective optical device 1.

In one embodiment, a coupling media such as, for example, an index matching liquid can be included between the photosensitive layer and the surface of the reflective optical device 1, which can drive away air trapped therebetween.

In one embodiment, air around the reflective optical device 1 can be filtered and/or circulated to reduce possible particle contaminations. The number and size of particles therein can be controlled to be class 100 or better.

A beam of light 60 is emitted from a light source and is directed through the carrier and the photosensitive layer 2' of the photosensitive film, and reflected from the reflective optical device 1. The light source is a coherent light source, for example, a laser and the beam of light is coherent light, for example, a laser beam. In one embodiment, images can be created in the photosensitive layer when light reflected from the reflective optical device 1 interferes with the incident light from the light source. In another embodiment, images can be created in the photosensitive layer when the beam 69 interferes with another beam of light from the opposite side of the photosensitive layer.

The reflective optical device 1 generally includes a portion that can reflect light. In one embodiment, the reflective optical device further includes a clear portion that is transparent to a laser beam. The reflective optical device 1 includes, for example, a master hologram, a plain or clear glass, and/or other appropriate optical devices. The master hologram is pre-prepared. The master hologram can be, for example, a reflection hologram. In one embodiment, the master hologram can be a silver halide master that includes a gelatin layer sealed by an optical glass for protecting the gelatin from moisture.

Images can be recorded in the photosensitive materials in different ways. In one embodiment, the reflective optical device 1 is a master hologram that can be copied in the photosensitive layer 2'. The master hologram can include a reflection hologram. Holographic images are created in the photosensitive layer when light reflected from the master hologram interferes with the light from the light source. The photosensitive layer can undergo a change in its index of refraction producing planes with higher refractive index within the layer. The wavelength of light can control the spacing of the planes and light can be efficiently reflected. Such holographic effects can be used to reconstructs an image of a three-dimensional image, which is difficult to counterfeit. The holographic images created can reflect primarily light of the same wavelength as the light source.

In one embodiment, the reflective optical device 1 can be a master hologram that can include a flat glass plate on the surface thereof. A portion of the photosensitive film can make a tight contact to the glass plate, without trapping air therebetween. The photosensitive film can be pressed firmly against the master hologram surface, and the system 100 and corresponding process to produce images in the photosensitive film can tolerate various vibrations, such as the vibrations that have to be controlled during producing a master hologram. It is known that vibration has to be controlled during producing a master hologram.

After the images are generated in the film 2', the developed photosensitive film can be collected by the roller take up 50. The roller take up 50 includes the meter roller 51 to control transferring the photosensitive film with a predetermined length, and a photo material core 52 to store the developed photosensitive film. Rollers 5f, 5g can be used to facilitate rolling the film. It will be appreciated that the developed photosensitive film can be post processed before stored by the core 52. In one embodiment, the photosensitive film is bleached using white light before the film is separated from the reflective optical device 1. Then the film can be rolled up or directly attached to a document.

Figure 2:
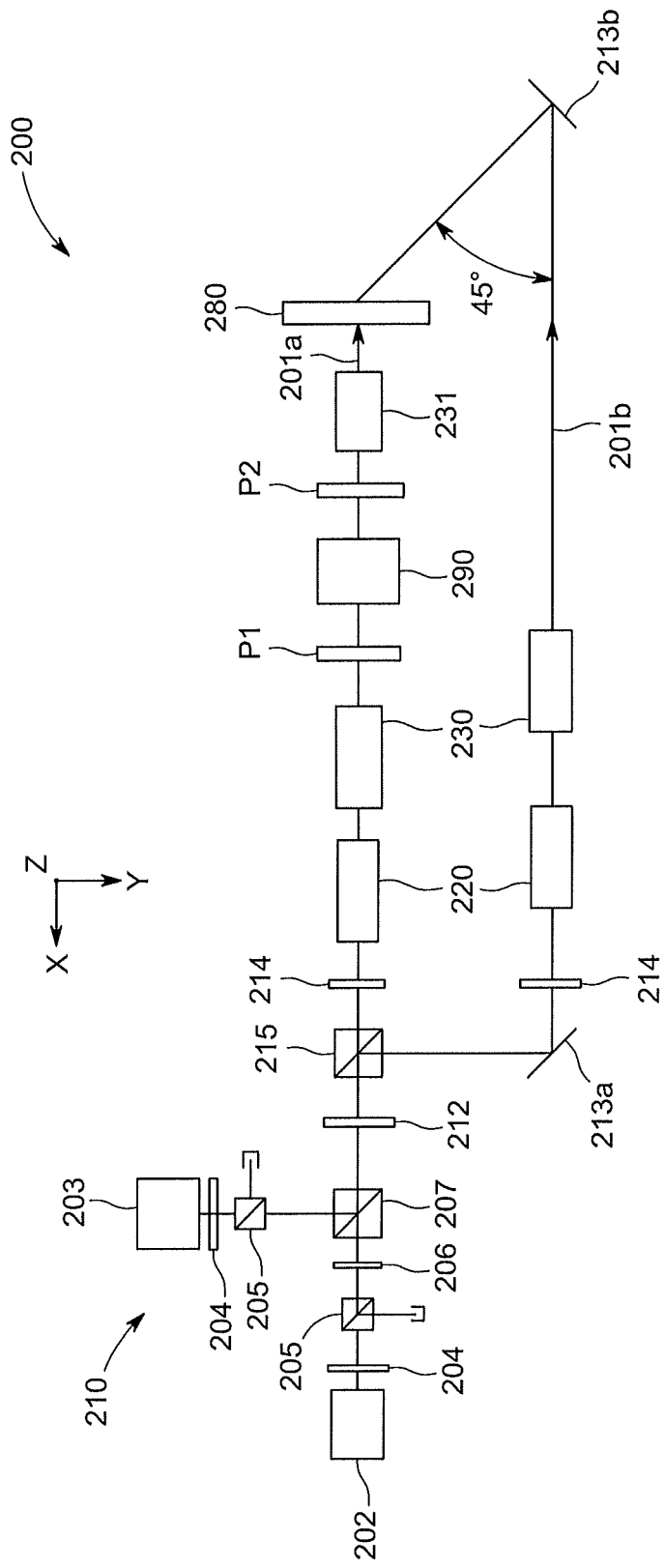
FIG. 2 illustrates an optical assembly with a two-beam configuration, according to one embodiment.

FIG. 2 illustrates an optical assembly 200 having a two beam configuration for producing a holographic image on a photosensitive film. The optical assembly 200 includes a laser system 210 that includes a red laser 202 and a green laser 203. Each of the lasers has a ½ wave plate 204 and a polarizing beam splitter 205 in the respective light path. A red laser beam from the red laser 202 through a shutter 206 is combined with the a green laser beam from the green laser 203 by a beam combiner 207.

As shown in FIG. 2, the combined laser beam from the laser system 210 through a ½ wave plate 212 is split into a first beam 201a and a second beam 201b by a beam splitter 215. Each of the beams 201a-b is directed through a shutter 214, a filter 220, and a collimator 230.

In some embodiments, the collimator 230 can be an expander that forms the laser beam into a line shape in the X-Z plane. For example, the laser beam can be expanded by the collimator 230 into a line extending in the Z direction and the length of the line matches the width of the photosensitive film. The images can be produced in a photosensitive film by scanning the line in the X direction. It will be appreciated that the laser beam can be modulated into a line, or other appropriate shapes, in any appropriate angle with respect to the X, Y or Z direction, so long as the laser beam 201a, 201b can be scanned to produce images in a given portion of the photosensitive film.

A spatial light modulator 290 with a polarizer set P1 and P2 is disposed on the light path of 201a. The spatial light modulator can be, for example, a Liquid Crystal Display (LCD), or a micro mirror array such as, for example, a micro-electro-mechanical-system (MEMS) mirror array or a digital-light-processing (DLP) micro mirror array. The incident beam 201a through a collimator 231 forms about zero degree with respect to a surface of a target 280 and can act as a reference beam. The beam 201b is directed by mirrors 213a-b, and forms about 45 degree with respect to an opposite surface of the target 280, and can act as an object beam. The beams 201a and 201b can produce 2D and 3D images at the same time in the target 280.

Figure 2A:
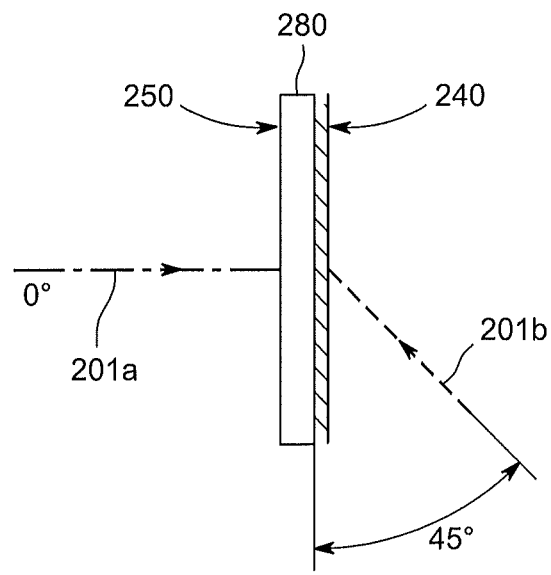
FIG. 2a illustrates the target in FIG. 2.
Figure 2B:
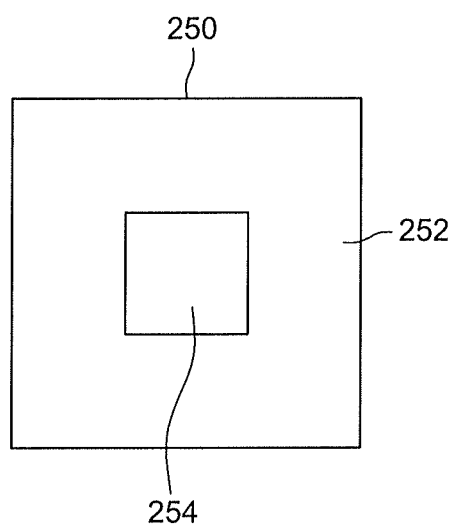

FIG. 2a illustrates the target 280, according to one embodiment. The target 280 includes a master hologram 250 and a photosensitive film 240 being pressed against a surface of the master hologram 250. FIG. 2b illustrates the master hologram 250. The master hologram 250 includes a first area 252 that includes a security pattern and a second area 254 that includes a clear glass. The first area 252 is a 3D area for producing a 3D holographic image. The second area 254 is transparent for the laser beam 201a to transmit through and produce a 2D image.

The laser beam 201b passes through the photosensitive film 240 and is reflected from the surface of the first area 252 of the master hologram 250 to generate the 3D holographic image in a first region of the photosensitive film 240. At the same time, the laser beam 201a projects a 2D image according to the variable date constructed by the special light modulator 290, transmits through the clear glass, and interferences with the laser beam 201b to produce a two dimensional pattern/image in a second region of the photosensitive film 240 that corresponds to the first area 252. In this way, the 3D and 2D images can be simultaneously produced in the photosensitive film 240.

In some embodiments, the relative dosages of the 3D and 2D images can be controlled by shuttering the laser beam 201a, while keeping the laser beam 201b to produce the 3D image.

The beam energy of the beams 201a and 201b is matched with one another to produce a holographic image. It is known in the art for adjusting the unit energy of two laser beams. The polarization of the beams 201a and 201b can be controlled to be the same "S" (i.e., in a direction perpendicular to a table plane) or "P" (i.e., in a direction generally parallel to the table plane). The beams 201a and 201b can have generally the same path length when the coherence length of laser beams is a few inches.

Figure 2C:
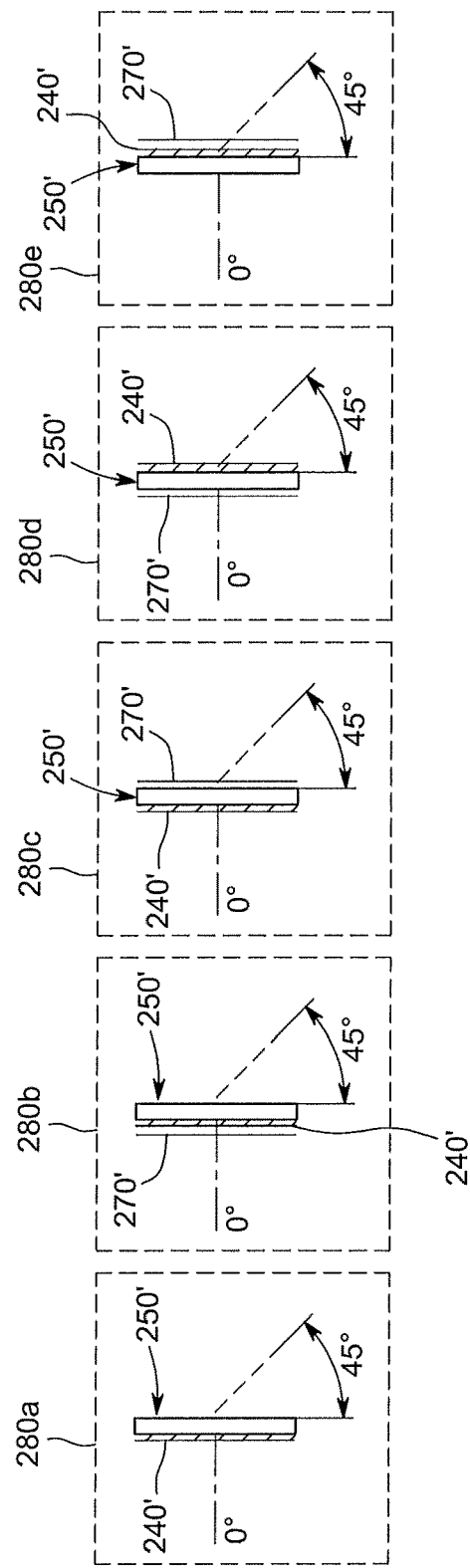
FIG. 2c illustrates multiple embodiments of the target in FIG. 2.

It is to be understood that the target 280 can include other configurations, such as, for example, targets 280a-e as shown in FIG. 2c where the target can include a photosensitive film 240', a reflective optical device 250', and/or a mask 270'.

Figure 3:
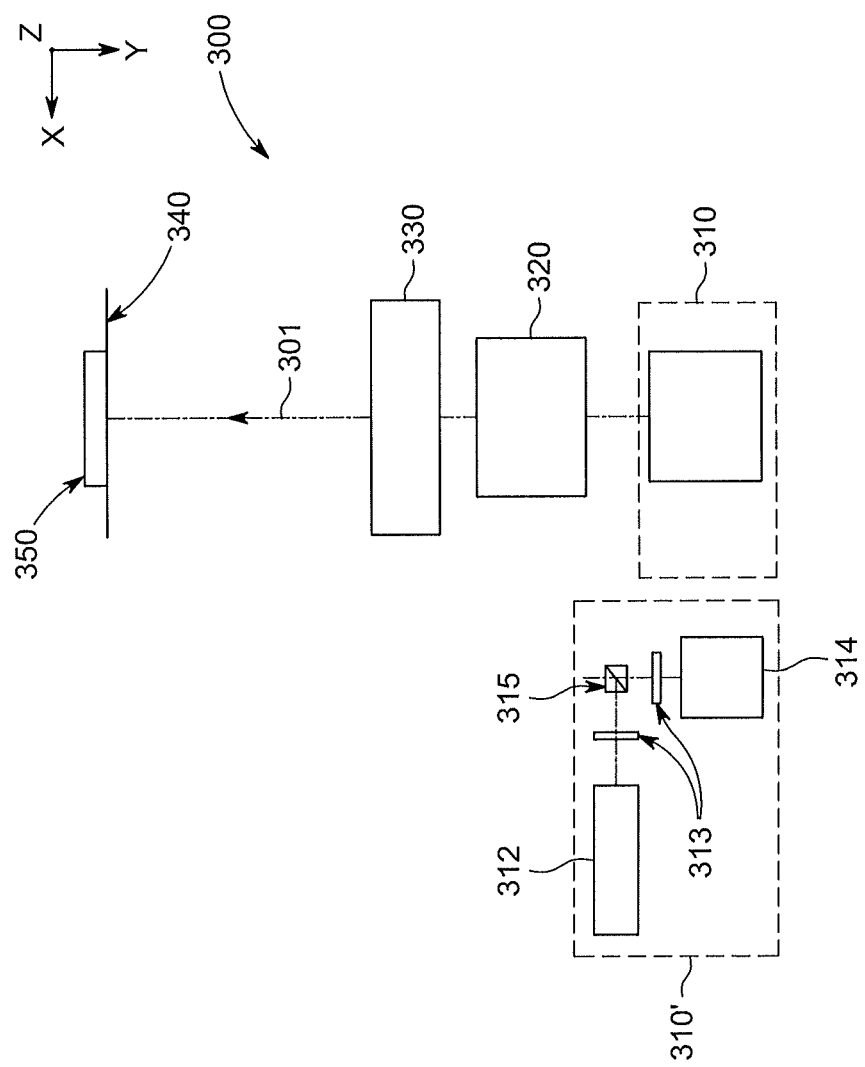
FIG. 3 is an optical assembly to direct a laser beam through a photosensitive film onto a master hologram, according to one embodiment.

The embodiment shown in FIG. 3 uses a single beam configuration. That is, light that passes through a photosensitive film can be both an object beam (e.g., the incident light) and a reference beam (e.g., the reflected light) that interfere with each other. FIG. 3 illustrates an optical assembly 300 that can direct a light beam through a photosensitive film to produce holographic images in the photosensitive film, according to one embodiment. The light beam 301 is a laser beam emitted from a laser 310, through a filter 320 and a collimator 330, and directed through the photosensitive film 340 onto a master hologram 350. The produced holographic images are copies of the master hologram 350. The laser 310 has a Brewster window with a Brewster angle of, e.g., about 33 to 34°. In some embodiments, the collimator 330 can be an expander.

In some embodiments, color images can be produced with light sources, such as the light source 210 that includes different wavelengths. For example, a photosensitive film, such as the film photosensitive 240, 340 that can respond to multiple wavelengths can be used to record color images by using multi-color light sources, for example, a red laser beam and a green laser beam. A photosensitive film simultaneously exposed with red and green laser beams can produce yellow color. In this way, three color holograms can be made using two colors at the same time.

FIG. 3 also illustrates an optional laser setup 310' where a green laser 312 and a red laser 314 are used. Shutters 313 are disposed between the lasers and a beam combiner 315 to control the input of laser beams. In one embodiment, if the reflective optical device 1 is a master hologram, the laser beam can be a first wavelength, e.g., the green laser 312 or the red laser 314. If the reflective optical device 1 is a clean glass, the laser beam can be a second wavelength different from the first wavelength, e.g., the red laser 314 or the green laser 312.

It will be appreciated that in an optical assembly, such as the optical assembly 200, 300 shown in FIGS. 2 and 3, one or more masks can be used to block a light beam so that images can be formed in a desired region of a photosensitive film. The mask can be, for example, a plastic media used in an over-head projector. The mask can be physically placed on the surface of the photosensitive film to shield an area thereon for later exposure. The area can include any convenient shapes including, for example, square, rectangle, star, circle, etc. The mask can include an art form such as, for example, picture, number, company logo, or any other features that a laser printer can produce in black ink on an overhead projector media.

Figure 4:
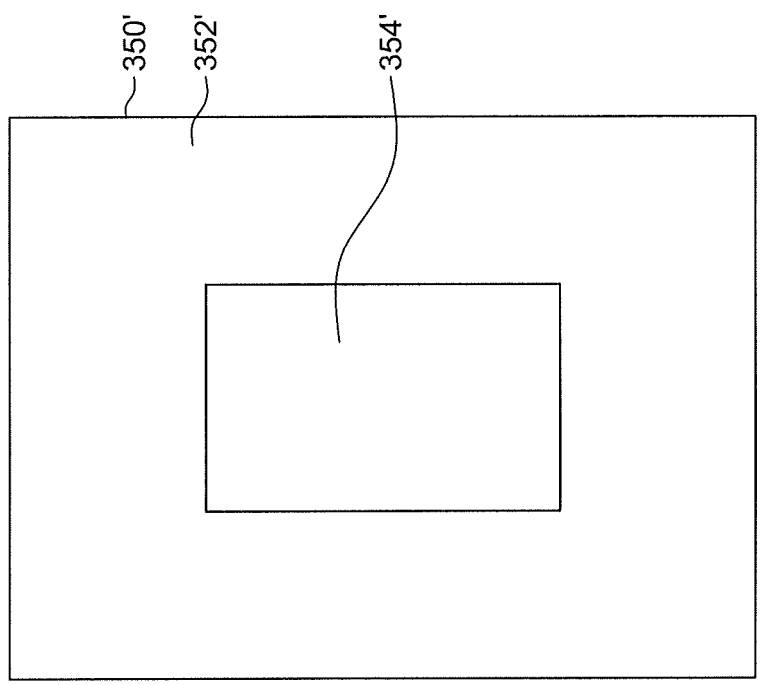
FIG. 4 illustrates a master hologram, according to one embodiment.

An image can be produced in a photosensitive film that contains both three dimensional holographic effects and two dimensional variable data using the optical assembly 300 shown in FIG. 3. A 3D holographic image can be produced using a master hologram. A 2D holographic image representing the 2D variable data can be produced using a spatial light modulator, such as, for example the spatial light modulator 290 in FIG. 2. The master hologram 350 can be a master hologram 350' shown in FIG. 4 that includes a first area 352' and a second area 354'. The first area 352' can be a 3D area for producing the 3D holographic image. The second area 354' can be 2D area for producing the 2D image.

A mask can be designed to block the first area 352' or the second area 354' when producing a 2D or 3D holographic image from the second area 354' or the first area 352'. In one embodiment, a portion of the photosensitive film 340 can be pressed against the master hologram 350'. A region of the photosensitive film 340 that contacts the second area 354' of the master hologram 350' can be masked to block the incident light. The laser beam 301 passes through the photosensitive film 340 and is reflected from the surface of the first area 352' of the master hologram 350' to generate the 3D holographic image in a first region of the photosensitive film 340. The mask is then removed. The laser beam 301 projects a 2D image according to the variable date constructed by a special light modulator such as the special light modulator 290, passes through the photosensitive film 340, and is reflected from the surface of the second area 354' of the master hologram 350' to generate the 2D holographic image in a second region of the photosensitive film 340.

In one embodiment, the second area 354' can be a clear glass. The 3D and 2D area can be exposed to obtain the 3D and 2D images simultaneously. Further single dosage of the 3D area can be obtained by shuttering the exposure on the 2D area.

In some embodiments, the photosensitive film can be roller-applied to each station prior to developing. For example, the photosensitive film can be supplied by a system, such as the system 100 of FIG. 1, pressed against a reflective optical device, such as a master hologram, and to produce a three dimensional holographic image and a two dimensional image in a portion of the photosensitive film by using an optical assembly, such as the optical assembly 200, 300. In some embodiments, the two dimensional image can be superimposed with the three dimensional holographic image. It will also be appreciated that the two dimensional image and the three dimensional holographic image may be separated from each other. In some embodiments, the two dimensional variable data and the three dimensional holographic image can be produced simultaneously. In some embodiments, the two dimensional variable data can be produced first, followed by producing the three dimensional holographic image. In some embodiments, the three dimensional holographic image can be produced first, followed by producing the two dimensional variable data.

In one embodiment, the image including 3D and 2D holographic images can be produced in two stations. One station can use a mask and a spatial light modulator, such as the spatial light modulator 290 in FIG. 2, to produce a 2D holographic image in a desired area with a desired form. The other station can use a master hologram, such as the master hologram 250, 350', to produce a 3D holographic image.

Figure 5:
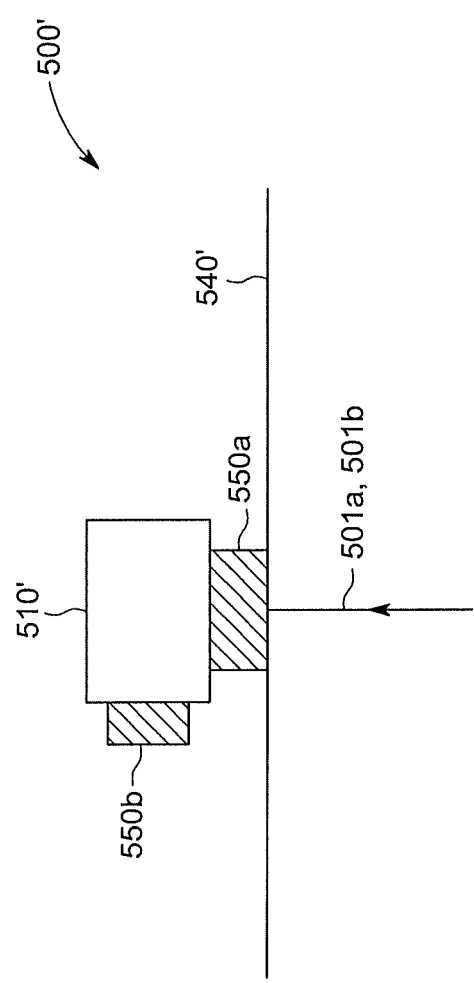
FIG. 5 is another system where two laser beams are directed through a photosensitive film onto first and second reflective optical devices, respectively, according to one embodiment.

In another embodiment, the images can be produced in a single station. FIG. 5 is an example of a system 500' where a station 510' is used for producing an image that contains both three dimensional holographic effects and two dimensional variable data. The station 510' is a multi-sided rotatable piece. For example, the station 510' can be rotated around an axis parallel to the Z direction. A first reflective optical device 550a is positioned on a first side of the station 510'. A second reflective optical device 550b is positioned on a second side of the station 510'. The first reflective optical device 550a can be, for example, a master hologram. The second optical device 550b can be, for example, a plain optical glass. A portion of the photosensitive film is pressed again the first reflective optical device 550a, by using, for example, the system 100. Similar to the process illustrated in FIG. 2, a light beam 501a, is directed through the photosensitive film 540' onto the master hologram 550a to produce a three dimensional holographic image in the portion of the photosensitive film. The station 550' is then rotated so that the photosensitive film faces the second side of the station 510'. The portion of the photosensitive film having the three dimensional holographic image is pressed against the second optical device 550b. Similar to the process illustrated in FIG. 3, a light beam 501b, projects a 2D image according to two dimensional variable data constructed by a spatial light modulator such as, for example, the spatial light modulators 290 of FIG. 2, and is directed through the photosensitive film 540 onto the second optical device 550b to produce a two dimensional pattern. It is to be understood that the light beams 501a and 501b can be the same or different light beams. A mask can be used to produce the 2D and 3D images in selected areas of the photosensitive film.

Figure 6:
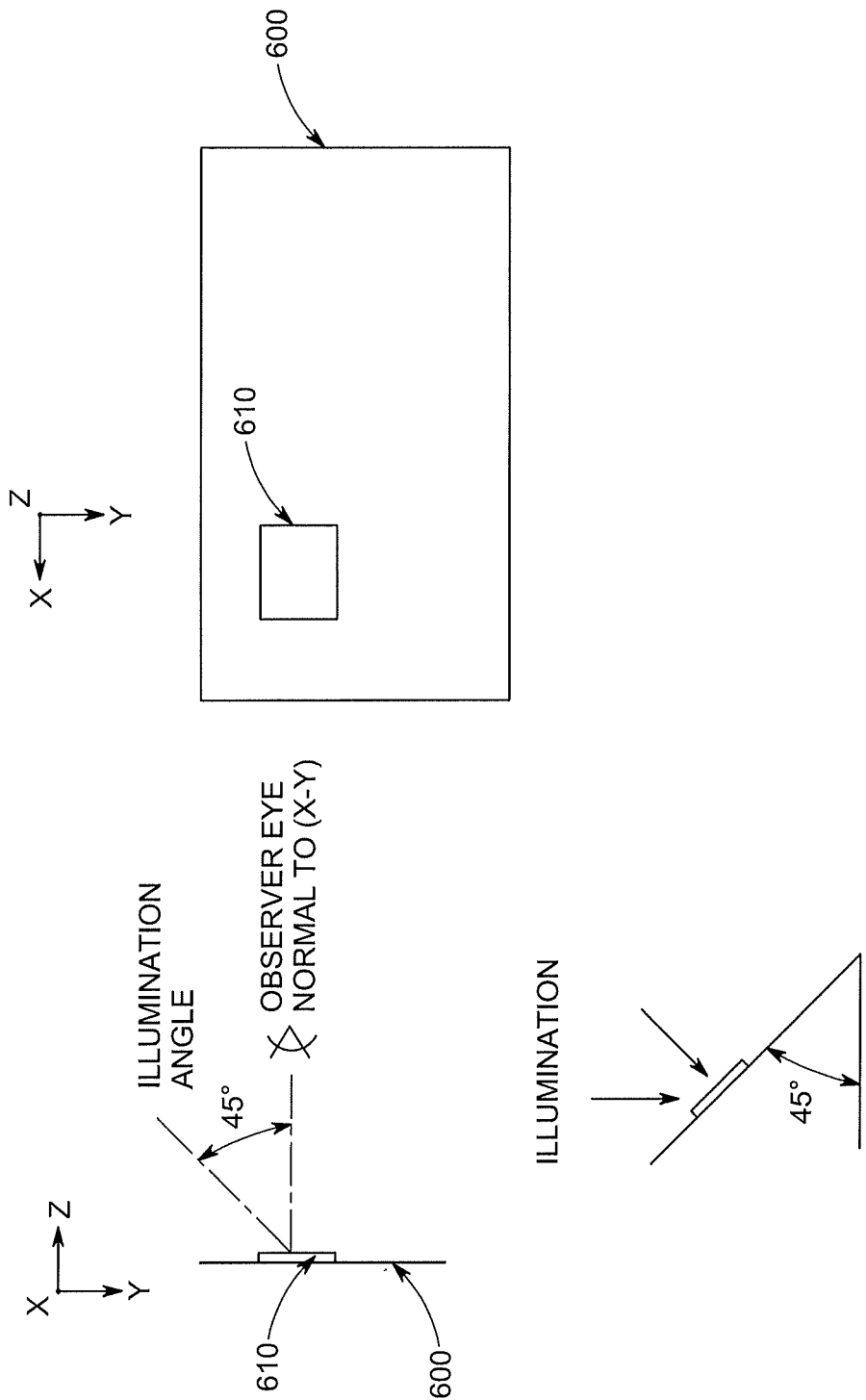
FIG. 6 illustrates an example of a document including images produced herewith, according to one embodiment.

The variable secure images produced in a photosensitive film as described herein can be used for a document, such as passports. FIG. 6 shows an example of a document 600 that includes images produced in a photosensitive film 610. The images can contain both three dimensional holographic effects and two dimensional variable data to authenticate the genuineness of the document and to personalize the security features. FIG. 6 also illustrate how to see the images by a user. The typical viewing angle can be normal to an X-Y plane along a Z axis. The viewing light angle for the user to view the holographic images can be, for example, at about 45° from the Z axis. With overhead lighting, the holographic images as held can be tipped to an angle in a manner similar as reading a book. The light illuminates the holographic image which reflects the light and the user sees the reflected image.

Figure 7:
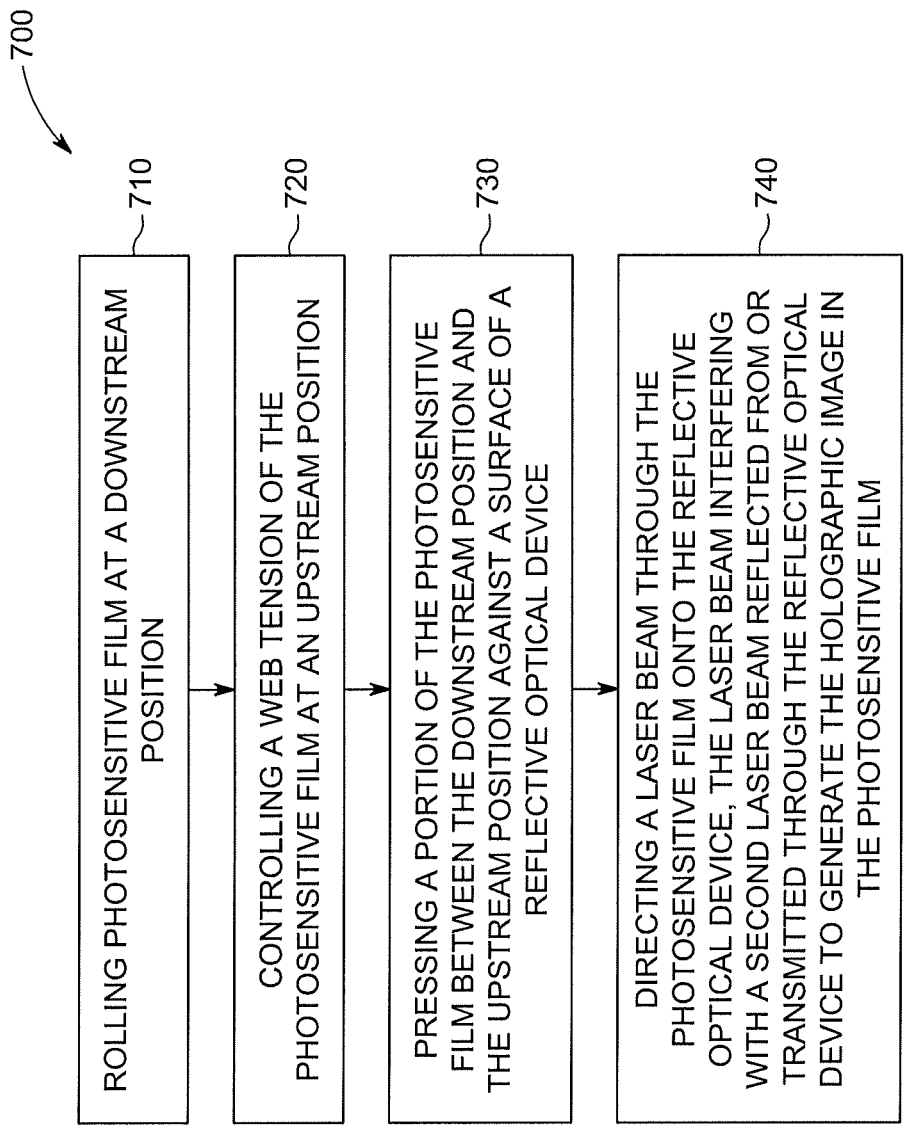
FIG. 7 illustrates a process for handling a photosensitive film to produce a holographic image therein, according to one embodiment.

FIG. 7 illustrates a process 700 for handling a photosensitive film to produce a holographic image therein. At block 710, the photosensitive film is rolled at a downstream position. In one embodiment, the photosensitive film is rolled continuously by a roller meter such as the roller meter 51 at a downstream position for a constant path length. At block 720, a web tension of the photosensitive film is controlled at an upstream position by a tension control mechanism such as the tension control mechanism 30. At block 730, a portion of the photosensitive film between the downstream position and the upstream position is pressed against a surface of a reflective optical device such as the reflective optical device 1, 350, 450, 550, by a mounting mechanism such as the mounting mechanism 40. At block 740, a laser beam is directed through the photosensitive film onto the reflective optical device where the laser beam interferes with a second laser beam reflected from or transmitted through the reflective optical device to generate the holographic image in the photosensitive film.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A process of producing a holographic image in a photosensitive film, comprising:
   rolling the photosensitive film at a downstream position from a station;
   controlling a web tension of the photosensitive film at an upstream position from the station;
   pressing a portion of the photosensitive film between the downstream position and the upstream position against a surface of a master hologram mounted on the station; and
   directing a first laser beam onto the photosensitive film from a first side thereof and directing a second laser beam onto the photosensitive film from a second side thereof to generate the holographic image in the photosensitive film,
   wherein the first laser beam is a combined laser beam produced from a first laser that generates a laser beam having a first wavelength and a second laser that generates a laser beam having a second wavelength, and the second laser beam is a combined laser beam produced from the first laser that generates the laser beam having the first wavelength and the second laser that generates the laser beam having the second wavelength,
wherein the holographic image comprises a two dimensional image and/or a three dimensional image.

2. The process of claim 1, further comprising controlling a projecting shape of each of the first and second laser beams on the photosensitive film, and scanning each of the first and second laser beams across the portion of the photosensitive film.

3. The process of claim 1, further comprising using a mask to block a portion of one of the first or second laser beams.

4. The process of claim 1, wherein controlling the web tension of the photosensitive film at the upstream position comprises rolling the photosensitive film in a start/stop mode.

5. The process of claim 1, wherein controlling the web tension of the photosensitive film at the upstream position includes alternatingly pulling the photosensitive film in an upstream direction and releasing the photosensitive film in an downstream direction.

6. The process of claim 1, wherein rolling the photosensitive film at the downstream position includes continuously rolling the photosensitive film with respect to the master hologram for a constant path length.

7. A process for handling a photosensitive film to produce a holographic image therein, comprising:
rolling the photosensitive film at a downstream position;
controlling a web tension of the photosensitive film at an upstream position;
pressing a portion of the photosensitive film between the downstream position and the upstream position against a surface of a reflective optical device;
directing a laser beam through the photosensitive film onto the reflective optical device, the laser beam interfering with a second laser beam reflected from or transmitted through the reflective optical device to generate the holographic image in the photosensitive film;
masking a second area of the portion of the photosensitive film, with a first area of the portion of the photosensitive film exposed;
directing the laser beam through the first area of the photosensitive film onto a first reflective optical device, and generating one or more three dimensional holographic images in the first area of the photosensitive film;
pressing the second area of the portion of the photosensitive film against a surface of a second reflective optical device;
projecting a two dimensional image according to two dimensional variable data with the laser beam; and
directing the laser beam through the second area of the photosensitive film onto the second reflective optical device, and generating one or more two dimensional images according to the two dimensional variable data in the second area of the photosensitive film.

8. A process for handling a photosensitive film to produce a holographic image therein, comprising:
rolling the photosensitive film at a downstream position;
controlling a web tension of the photosensitive film at an upstream position;
pressing a portion of the photosensitive film between the downstream position and the upstream position against a surface of a reflective optical device;
directing a laser beam through the photosensitive film onto the reflective optical device, the laser beam interfering with a second laser beam reflected from or transmitted through the reflective optical device to generate the holographic image in the photosensitive film; and
directing the second laser beam to transmit through the reflective optical device, wherein the reflective optical device is a master hologram including a first area with a security pattern and a second area, the holographic image includes a two dimensional image and a copy of the security pattern of the master hologram, the laser beam is reflected from the first area to generate the copy of the security pattern, the second laser beam transmits through the second area to generate the two dimensional image, the two dimensional image and the copy of the security pattern of the master hologram are generated simultaneously.

9. A system that produces a holographic image in a photosensitive film by copying a master hologram, comprising:
a supply mechanism to supply the photosensitive film to the master hologram;
a tension-control mechanism to control a web tension of the photosensitive film;
a mounting mechanism to press a portion of the photosensitive film against a surface of the master hologram;
an optical assembly that includes a first laser that generates a laser beam having a first wavelength and a second laser that generates a laser beam having a second wavelength, a beam combiner that receives and combines the laser beam from the first laser and the laser beam from the second laser to produce a combined beam, a beam splitter that receives the combined beam and splits the combined beam into a first laser beam and a second laser beam, a beam path for the first laser beam to impinge onto the photosensitive film from a first side thereof, and a beam path for the second laser beam to impinge onto the photosensitive film from a second side thereof, wherein the holographic image comprises a two dimensional image and/or a three dimensional image; and
a roller take-up downstream from the supply mechanism to collect the photosensitive film.

10. The system of claim 9, wherein the mounting mechanism is separate from the tension-control mechanism, and the tension-control mechanism includes a roller that is movable in a direction generally parallel to the surface of the master hologram.

11. The system of claim 10, wherein the mounting mechanism includes an apply roller that is movable separately from the roller in a direction generally parallel to the surface of the master hologram.

12. The system of claim 11, wherein the mounting mechanism includes a guide pin, the apply roller and the guide pin are generally parallel to the surface of the master hologram and with one another, the photosensitive film is rolled around the apply roller and the guide pin in an "S" shape.

13. The system of claim 9, wherein the beam path for the first laser beam includes a spatial light modulator including a liquid crystal display (LCD), or a micro mirror array.

* * * * *